(12) United States Patent
Yan et al.

(10) Patent No.: US 7,720,328 B2
(45) Date of Patent: *May 18, 2010

(54) THERMAL CONTROL OF OPTICAL COMPONENTS

(75) Inventors: Ming Yan, Pleasanton, CA (US);
Anthony J. Ticknor, Cupertino, CA (US); Calvin Ho, San Jose, CA (US); Hao Xu, San Jose, CA (US); Jason Weaver, San Jose, CA (US); Thomas S. Tarter, San Jose, CA (US); Jane Lam, San Jose, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/241,860

(22) Filed: Sep. 30, 2008

(65) Prior Publication Data
US 2009/0087138 A1 Apr. 2, 2009

Related U.S. Application Data

(63) Continuation of application No. 10/760,145, filed on Jan. 16, 2004, now Pat. No. 7,447,393.

(51) Int. Cl.
*G02B 6/12* (2006.01)
(52) U.S. Cl. .................................... 385/14
(58) Field of Classification Search ............ None
See application file for complete search history.

(56) References Cited

U.S. PATENT DOCUMENTS 5,999,671 A    12/1999   Jin et al.

6,266,464 B1    7/2001   Day et al.

(Continued)

FOREIGN PATENT DOCUMENTS

EP    1 111 418 A2    6/2001

(Continued)

OTHER PUBLICATIONS

Dieckroger, et al., Thermooptically Tunable Optical Phased Array in SiO2-Si, IEEE Photonics Tech. Letters, vol. 11, No. 2, Feb. 1999.

(Continued)

*Primary Examiner*—Sung H Pak
(74) *Attorney, Agent, or Firm*—Turocy & Watson, LLP

(57) ABSTRACT

A linearized thermal and optical model of an optical integrated circuit can be used to temperature-stabilize one or more optical elements of the circuit using active temperature regulation. To stabilize a single optical element, a temperature sensor and a heater can be provided proximate to the grating. Thermal and optical coefficients can be then used to select an appropriate temperature set-point for the temperature controller that receives readings from the sensor and determines the power dissipated in the heater. Multiple optical elements can be stabilized individually, using the same process and lumping cross-heating factors together with other environmental factors. Alternatively, multiple AWG's can be stabilized using fewer sensors than optical elements, by stabilizing one of the optical elements in the same manner as in the case of a single optical elements, and determining power dissipated in the heaters of the remaining optical elements based on the linearized model.

20 Claims, 7 Drawing Sheets

U.S. PATENT DOCUMENTS

| | | | |
|---|---|---|---|
| 6,498,878 | B1 | 12/2002 | Ueda |
| 6,853,773 | B2 | 2/2005 | Lin |
| 7,447,393 | B2 * | 11/2008 | Yan et al. ........................ 385/14 |
| 2002/0035835 | A1 | 3/2002 | Oguma |
| 2002/0159698 | A1 | 10/2002 | Lin |
| 2004/0202421 | A1 | 10/2004 | Iiduka et al. |

OTHER PUBLICATIONS

Chu, et al., Temperature Insensitive Vertically Coupled Mirroring Resonator Add/Drop Filters by Mears of a Polymer Overlay IEEE, pp. 1138-1140.

Photonics Tech. Letters, vol. 11, No. 9, pp. 248-250, Sep. 1999.

International Search Report for PCT/US05/47513 dated Sep. 28, 2006.

Yan, et al. Integrated Thin Film Heater and Sensor With Planar Lightwave Circuits, Semiconductor Thermal Measurement and Management Symposium, 2004, pp. 185-190.

Yan, et al. Individual Control of Multiple AWGs on a Monolithic Chip Using Integrated Thin Film Heaters and Sensors, 2005 Optical Fiber Communications Conference Technical Digest, 2005, vol. 2, pp. 87-89.

Supplementary European Search Report corresponding to U.S. Appl. No. 12/241,860 mailed on Aug. 28, 2009.

* cited by examiner

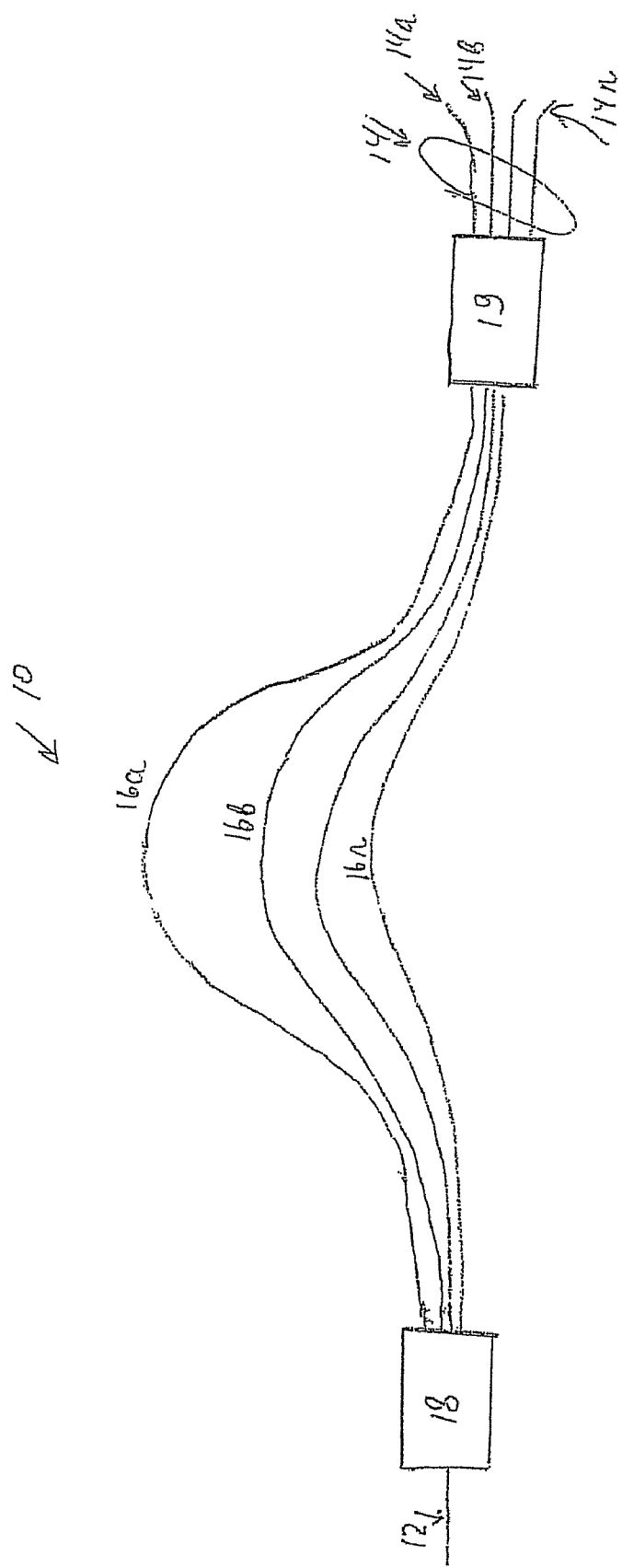

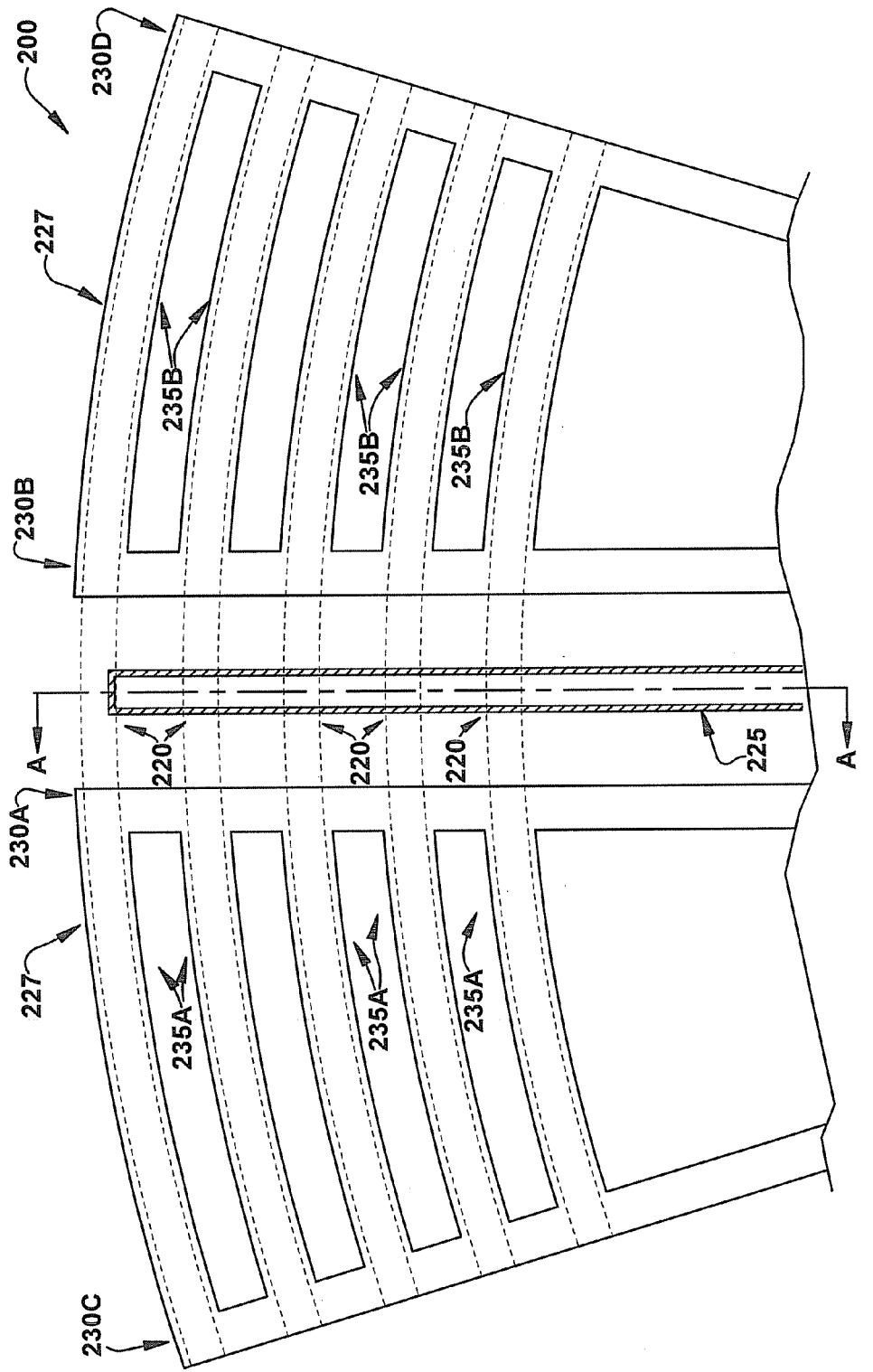

THERMAL CONTROL OF OPTICAL COMPONENTS

CROSS REFERENCE TO RELATED APPLICATIONS

This application is a continuation of U.S. application Ser. No. 10/760,145, filed on Jan. 16, 2004, the entirety of which is incorporated herein by reference.

TECHNICAL FIELD

The present invention relates generally to fiber optic communications, and, more particularly, to tuning and temperature stabilization of optical waveguide filters and other temperature-sensitive integrated optical components.

BACKGROUND

Fiber optic technology has now been used in telecommunications for several decades. In high-bandwidth applications, optical fiber has virtually replaced old-fashioned copper wire. The reasons for this transition are many. Optical fiber's advantages over copper wire include wide bandwidth, low signal attenuation, light weight, immunity to electromagnetic interference, absence of electrical sparking, virtual elimination of crosstalk, physical flexibility, small size, and low cost.

In optical networks, an electrical signal to be transmitted modulates light, typically of the infrared variety with a wavelength in the 1.3 or 1.5 µm bands. The modulated light is transmitted over an optical fiber, received, and demodulated to recover a copy of the original electrical signal.

A significant number of fiber-optic networks is intended for the commercial transport of data. As such, the network operator seeks wide bandwidth capability at low cost, with high reliability, fidelity, efficiency, and security. The transmission bandwidth of a single fiber is quite high. Cost-effective systems that transport data at 10 Gbits/s (OC-192) and 40 Gbits/s (OC-768) on a single wavelength channel are presently available, and the transmission rate capability will likely continue to grow. But the total throughput theoretically realizable from a fiber is much higher, several tens of Terahertz. Dense wavelength-division multiplexing (DWDM) systems have evolved to use more of this available spectrum. In such systems, many different wavelength channels are used concurrently to transmit data-carrying signals over the same fiber. Systems using up to 160 different wavelengths that carry as much as 10 Gbit/s each and provide a total capacity of 1.6 Tbit/s in a single fiber have been developed. For fiber links requiring less capacity, a less dense architecture, called coarse wavelength-division multiplexing (CWDM), with fewer channels at more widely spaced wavelengths, may be used in similar fashion. DWDM and CWDM will be collectively referred to as wavelength-division multiplexing, or WDM.

In WDM optical networks, it is necessary to multiplex (combine) multiple independent wavelengths when transmitting, and demultiplex (separate) those wavelengths back into individual channels when receiving. Multiplexing and demultiplexing functions are performed by optical filters, typically thin-film interference filters, waveguide interferometers such as arrayed-waveguide gratings (AWG's), or fiber Bragg gratings. The nodes of an optical network typically provide both types of functions, extracting some or all of the individual wavelength channels on one or more inbound fibers, and recombining some of those wavelengths with new wavelengths carrying data from local sources into one or more outbound fibers. Optical filters that perform these and other functions are distributed abundantly throughout a WDM optical network.

Significant costs are associated with converting data from optical to electrical representation, or from electrical to optical representation. Therefore, it is usually preferred that data that is not bound to or from the local traffic of a node be passed through the node transparently, that is with no conversion or non-linear processing. Because of the transparency, a given optical signal may pass through several optical filters on its route through the network. To avoid excessive degradation of signal fidelity, the precision and stability of the optical filter bandshapes and phase responses need to be more stringently controlled in a distributed network than for direct connections.

AWG's are fabricated from integrated planar waveguides and scale elegantly to higher channel counts. Although they are the most recently developed of the commonly-applied filter architectures, AWG's are beginning to dominate applications where eight or more optical channels are being multiplexed or demultiplexed, because of their high performance and cost-effectiveness. FIG. 1 illustrates a typical arrayed waveguide grating 10 with an input waveguide 12, one or more output waveguides 14, a phased array of waveguides 16 arranged side-by-side, and a pair of focusing slab regions 18 and 19. The focusing slab region 18 couples light from the input waveguide 12 into the near end of the waveguides of the phased array 16, while the focusing slab region 19 couples the light emerging at the far end of the waveguides of the phased array 16 into the output waveguides 14. The waveguides of the phased array 16 have different lengths, with a constant optical path-length difference $\Delta L_{op}$ between neighboring waveguides.

When monochromatic light illuminates the input waveguide 12, the slab 18 spreads the energy of the light into the near ends of the waveguides 16a-16n. Because of the differing optical path-lengths of the waveguides 16a-16n, the light emerging at the far ends of the waveguides 16a-16n has different phases, depending on the particular waveguide traveled by the light. After the emerging light is combined by the focusing slab region 19, the different phases interfere constructively at some point, depending on the wavelength of the light. If the point is coincident with one of the output waveguides 14, the light is coupled into this optical waveguide. Changing the wavelength of the monochromatic light changes the point of constructive interference, moving it from one output waveguide (e.g., 14a) to another (e.g., 14b).

As is known from linear system theory, a non-monochromatic WDM light signal having a spectral distribution of $$\sum_i c_i * \lambda_i$$

can be treated simply as a collection of individual monochromatic signals $c_i * \lambda_i$. Therefore, if the input waveguide 12 is illuminated with this WDM signal, each of its constituent wavelength components $\lambda_i$ will focus at a different point and will be coupled into a different output waveguide 14. The constituent wavelength channels $\lambda_i$ of the WDM signal are thus physically separated—i.e., demultiplexed—into different output waveguides 14. Through reciprocity principle applicable to electromagnetic fields, if a wavelength $\lambda_j$ incident on the input waveguide 12 is channeled into an output waveguide $14_j$, then the same wavelength channel $\lambda_j$ incident on the output waveguide $14_j$ will be channeled—i.e., multiplexed—into the input waveguide 12. The arrayed waveguide grating 10 can thus be used as both a multiplexer and a demultiplexer, depending on which end is selected as the input.

Planar waveguide technology used for fabricating AWG's is an optical integration technology. As optical network nodes become more and more complex, the AWG becomes just one of multiple optical circuit elements integrated onto a chip. Examples of devices having higher scales of integration include multiplexer/demultiplexer matched pairs, add-drop multiplexers, programmable wavelength blockers, and wavelength-selective routing switches. There are of course other integrated optical circuits that may include one or more arrayed waveguide gratings.

One way of more stringently controlling the precision and stability of the optical filter bandshapes and phase responses of AWG's is to control the center wavelength of the AWG. The center wavelength $\lambda_c$ of an AWG depends on the phase shifts through the phased waveguides of the AWG. ("Center wavelength" means the wavelength that is optimally or near optimally channeled into a particular output waveguide.) The phase shifts depend on the refractive index of the waveguides, which in turn depends on the temperature of the waveguides. For silica-based waveguides, the magnitude of the temperature coefficient of the refractive index $$\left(\frac{dn}{dT}\right)$$

is of the order of $10^{-5}/(° C.)$, or 10 parts per million per degree Celsius, which translates into a similar magnitude of the wavelength temperature coefficient $$\left(\frac{dn}{dT}\right),$$

and into a temperature frequency coefficient $$\left(\frac{df}{dT}\right)$$

of about 2 GHz/(° C.) at 1.5 µm wavelength. For channel spacing of about 100 GHz and less, operation of the arrayed waveguide grating over the commercial temperature range of even 60° C. is problematic. Moreover, without expensive trimming it is difficult to manufacture arrayed waveguide gratings having sufficient center wavelength accuracy for the relatively narrow channel spacing. For this reason, arrayed waveguide gratings and similar optical components are center wavelength-stabilized.

Most commonly this stabilization is accomplished by actively regulating the temperature of the optical chip. According to this method, a heating element uniformly elevates the temperature of the component to a set-point temperature. Varying the selection of the set-point temperature allows tuning of the grating to a chosen center wavelength, eliminating or decreasing the need for trimming and increasing yields.

In one variation on the basic method of thermally tuning an arrayed waveguide grating, an integrated heater is patterned to cover longer lengths of some waveguides of the phased array than of other waveguides of the array. If the shape of the heater is properly chosen, localized heating generated by the operation of the patterned heater causes an increase in the effective optical path-length differences between neighboring waveguides. In other words, it causes tilting of the waveform to increase (or decrease) by a higher factor than would have resulted from a heater uniformly distributed over the array's waveguides. Because the patterned heater affects the phased waveguides unevenly, the sensitivity of the center wavelength to temperature of the heater increases, and the tuning range of the grating increases along with it. The shifting of the center wavelength thus becomes more efficient, and less thermal energy can be applied to produce the same thermo-optic tilt of the output waveform. In this document, such patterned heaters will be referred to as "efficient patterned heaters."

Optical integrated circuits may contain arrayed waveguide gratings, waveguides, optical couplers, splitters, three dimensional optical memory devices, Bragg gratings, optical attenuators, optical splitters, optical filters, optical switches, lasers, modulators, interconnects, optical isolators, optical add-drop multiplexers (OADM), optical amplifiers, optical polarizers, optical circulators, phase shifters, optical mirrors/ reflectors, optical phase-retarders, optical detectors, and other optical components. It should be understood that optical integrated circuits are not 'circuits' in the strict sense (e.g., they do not have 'ground' paths), although they are commonly called optical integrated circuits by analogy to electrical integrated circuits. As in the case of electrical (semiconductor) integrated circuits, fabrication of several optical components on a shared substrate results in several advantages, including substantial cost savings during manufacture, and smaller size of the assembly. Multi-device optical integrated circuits built with planar waveguides on common substrates are known as "planar lightwave circuits," or PLCs.

In order to fabricate an AWG directly to the 100 GHz optical frequency grid commonly used for DWDM, the accuracy of absolute index of refraction would need to be better than $10^{-5}$. This level of process control is presently difficult to achieve. As has already been discussed, actual manufacturing variations can be compensated for by adjusting the selected operating temperature for active stabilization. It is unlikely that two AWG's on the same chip would require the same stabilization temperature. Given the currently employed methods of wavelength stabilization, it is challenging to control thermally more than one grating on a given PLC.

SUMMARY

A need thus exists for methods for precisely temperature-stabilizing optical components. Another need exists for lightwave circuits that can include multiple temperature-stabilized components, particularly arrayed waveguide gratings, on a common substrate. A further need exists for methods of controlling the temperature of optical components with high accuracy to keep the center wavelengths of the components stable.

The present invention is directed to apparatus and methods that satisfy one or more of these needs. The invention herein disclosed is an integrated optical device that comprises an optical component having an optical wavelength response (e.g., center wavelength) that is a function of temperature of the optical component, and a heating element disposed in proximity to the optical component to be capable of inducing temperature elevation of the optical component. At a first effective temperature of the optical component, the optical wavelength response of the optical component is substantially equal to a predetermined wavelength. The integrated optical device further comprises a temperature-sensing element capable of generating indications of temperature at location of the temperature-sensing element, wherein temperature elevations induced at the location by the heating element exceed corresponding temperature elevations induced by the heating element in at least one region of the optical device. Both the temperature-sensing element and the heating element can be coupled to a temperature controller, which receives the indications of temperature from the temperature sensing element and sets power dissipated in the heating element based on the indications of temperature so as to drive the optical wavelength response to the predetermined wavelength. The design of the integrated optical device is such that, during stable thermal state of the optical device, indications of temperature generated by the temperature-sensing element vary as a first substantially linear function of the power dissipated in the heating element, and effective temperature of the optical component varies as a second substantially linear function of the power dissipated in the heating element.

The first substantially linear function is characterized by a first thermal constant that is the rate of increase in the indications of temperature with the power dissipated in the heating element, while the second substantially linear function is characterized by a second thermal constant that is the rate of change in the optical wavelength response with the power dissipated in the heating element.

In operation, the temperature controller estimates global temperature of the optical component during a first period based on (i) one or more temperature indications received from the temperature-sensing element during the first period, (ii) the power dissipated by the heating element during the first period, and (iii) the first thermal constant. The temperature controller then determines a set-point to which the temperature controller drives temperature indications of the temperature-sensing element during a second period that follows the first period by malting the following calculations:

(1) computing a difference between the first effective temperature and the estimate of the global temperature of the optical component during the first period;

(2) computing a ratio of the first thermal constant to the second thermal constant;

(3) computing a product of the difference and the ratio, and (4) adding the product to the estimate of the global temperature of the optical component during the first period to obtain the set-point.

Another embodiment of the integrated optical device includes two sets of parts described above, i.e., two optical components, two heating and temperature-sensing elements, and two temperature controllers. Each set of components functions substantially independent of the other set to stabilize each optical component (e.g., an optical filter) at the component's specific effective temperature corresponding to a particular center wavelength. The two center wavelengths can be the same, although the effective temperatures of the two gratings will typically be different even if the two wavelengths are the same. Optionally, a single temperature controller can be used to stabilize both optical components.

In yet another embodiment, the integrated optical device comprises first and second optical components, first and second heating elements, a temperature-sensing element, and a temperature controller. The first optical component has a first optical wavelength response that is a function of temperature of the first optical component, wherein the first optical wavelength response is substantially equal to a first predetermined wavelength at a first effective temperature of the first optical component. The first heating element is disposed in proximity to the first optical component and is capable of inducing temperature elevation of the first optical component, while the temperature-sensing element is capable of generating indications of temperature at a first location of the first temperature-sensing element. The first location is such that temperature elevations induced at the first location by the first heating element exceed corresponding temperature elevations induced by the first heating element in a first region remote from the first location of the optical device. Typically, the first temperature sensing element is disposed near the first heating element and the first optical component. The temperature controller can be coupled to the first heating element and to the first temperature-sensing element to receive the indications of temperature from the first temperature-sensing element and to set power dissipated in the first heating element based on the indications of temperature received from the first temperature-sensing element so as to drive the first optical wavelength response to the first predetermined wavelength.

The second optical component has a second optical wavelength response that is a function of temperature of the second optical component, wherein the second optical wavelength response is substantially equal to a second predetermined wavelength at a second effective temperature of the second optical component. The second heating element is disposed proximate to the second optical component and is capable of inducing temperature elevation of the second optical component.

Component placement and other design selections of this embodiment are such that indications of temperature generated by the first temperature-sensing element during stable thermal state vary as a first substantially linear function of the power dissipated in the first heating element, the first substantially linear function being characterized by a first thermal constant that is the rate of change in the indications of temperature generated by the first temperature-sensing element with the power dissipated in the first heating element. The effective temperature of the first optical component during stable thermal state varies as a second substantially linear function of the power dissipated in the first heating element, the second substantially linear function being characterized by a second thermal constant that is the rate of change in the effective temperature of the first optical component with the power dissipated in the first heating element. The effective temperature of the second optical component during stable thermal state varies as a third substantially linear function of the power dissipated in the second heating element, wherein the third substantially linear function is characterized by a third thermal constant that is the rate of change in the effective temperature of the second optical component with the power dissipated in the second heating element.

In operation, the temperature controller can be used to estimate global temperature of the first optical component during a first period based at least in part on (i) one or more temperature indications received from the first temperature-sensing element, (ii) the power dissipated by the first heating element, and (iii) the first thermal constant. The temperature controller then can be used to determine a first set-point to which the temperature controller drives temperature indications generated by the first temperature-sensing element during a second period that follows the first period. The first set-point can be determined as follows:

The temperature controller (1) computes a first difference between the first effective temperature and the estimate of the global temperature, (2) computes a ratio of the first thermal constant to the second thermal constant, (3) computes a first product of the first difference and the ratio, and (4) adds the first product to the estimate of the global temperature to obtain the first set-point.

The temperature controller also can be used to determine a second set-point to which the temperature controller sets the power dissipated in the second heating element. The second set-point can be determined as follows:

The temperature controller (1) computes a second product of the second thermal constant and the power dissipated in the first heating element, (2) computes a second difference by subtracting the second effective temperature from the second effective temperature, (3) computes a sum by adding the second product to the second difference, and (4) divides the sum by the third thermal constant to obtain the second set-point.

These and other features and aspects of the present invention will be better understood with reference to the following description and appended claims.

BRIEF DESCRIPTION OF THE FIGURES

FIG. 1 illustrates an arrayed waveguide grating;

FIG. 2A is a top view of a temperature controlled arrayed waveguide grating, in accordance with the present invention;

DETAILED DESCRIPTION

Figure 2B:
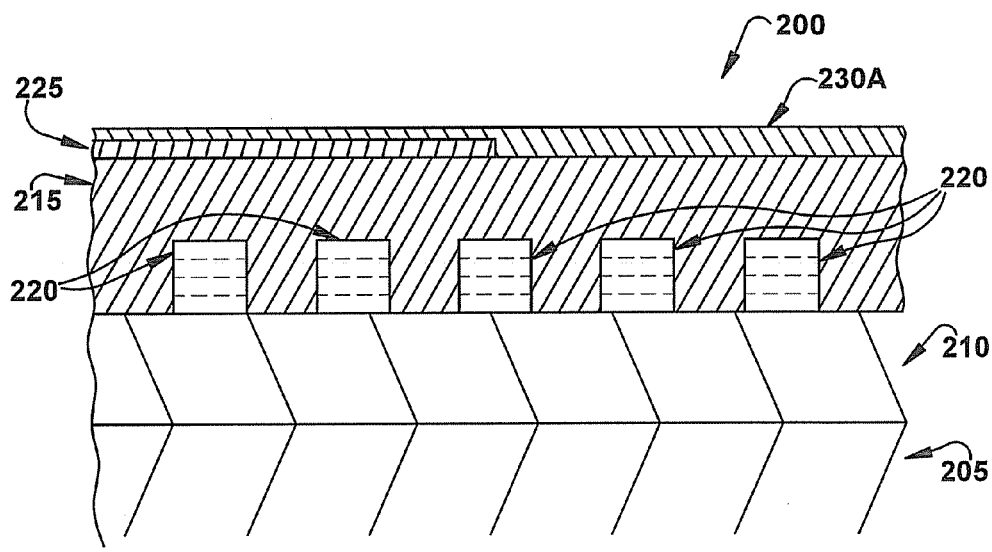
FIG. 2B is a cross-sectional view of a temperature controlled arrayed waveguide grating of FIG. 2A, with the cross-section taken along the line A-A'.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner. In addition, the terms arrayed waveguide grating, grating, and AWG are used interchangeably, unless the difference is noted or made otherwise clear from the context. AWG and equivalent terms are also used to refer both to the physical waveguide array and to the optical filter device based on such an array.

Referring more particularly to the drawings, FIGS. 2A and 2B illustrate, respectively, a top view and a cross-sectional view (along the line A-A') of an exemplary temperature controlled arrayed waveguide grating 200 in accordance with the present invention. The grating 200 can be built on a planar substrate 205, which can be made from silicon in this particular embodiment. A lower cladding layer 210 can be deposited on the substrate 205, and a plurality of waveguides 220 can be formed on the lower cladding layer 210. An upper cladding layer 215 can be formed on the lower cladding layer 210 and on the waveguides 220, so that the two cladding layers 210 and 215 surround the waveguides 220. The cladding layers 210 and 215 can be made of silica, while the waveguides 220 can be made of doped silica. The refractive index of the material of the waveguides 220 can be higher than that of the materials of the cladding layers 210 and 215, so that light can travel through the waveguides 220 in a direction perpendicular to the plane of the depicted cross-section. As can be seen from FIG. 2A, the waveguides 220 can be curvilinear, thus providing different lengths and phase shifts between their respective terminations.

An integrated patterned heater 227 can be wedge-shaped, though other shapes can be also used. It includes buses 230A-D, and heater elements 235A and 235B. In the illustrated embodiment, each heater element 235 spans between a pair of buses 230 above one of the waveguides 220, and can be designed to dissipate the same power per unit length. The buses 230 can be thicker than the heater elements 235 to provide a relatively constant operating voltage to each of the heater elements 235. Thus, the heat generated per unit length of the portions of the waveguides 220 that are covered by the heater elements 235 can be also substantially the same. Consequently, the resulting tilting of the light waves due to operation of the heater 227 takes place with relatively little distortion caused by the operation of the heater 227.

The response time of the refractive index of the waveguides 220 to a change in the electrical power applied by the heater 227 can be greater than one millisecond (although response times of less than 1 millisecond are also possible). This enables the heater 227 to be operated not only by direct current (DC), but also by alternating current (AC), or pulse-width modulated (PWM) electrical signals, as long as the AC or PWM signals have appropriately high frequencies. In some embodiments, the frequencies can be above a threshold determined by the inverse of the response time. In other, more specific embodiments, the frequencies can be above about 1 KHz.

Figure 5:
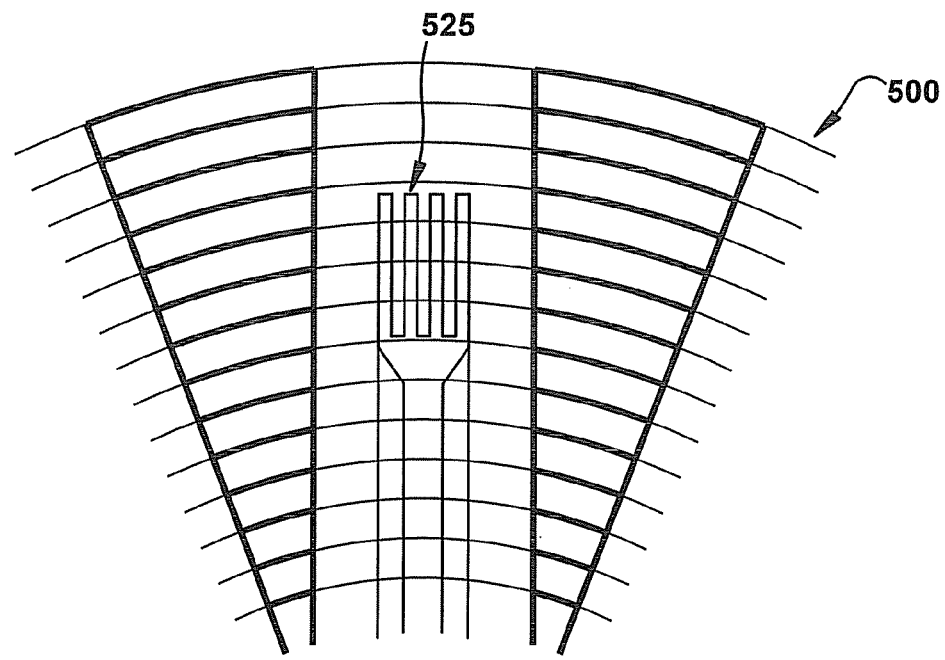
FIG. 5 is a top view of an arrayed waveguide grating with a localized temperature sensor, in accordance with the present invention.

Reference numeral 225 designates an exemplary temperature sensor for monitoring the temperature of the grating 200. In one embodiment, it can be made from the same material as the heater 227 and deposited on the upper cladding layer 215 and shaped together with the heater buses 230 and the heater elements 235. The material used for the temperature sensor 225 has a positive resistance temperature coefficient and exhibits substantially linear behavior over the spectrum of temperatures of interest, e.g., in the range(s) of about 30 to about 120 degrees Celsius. In some variants of the grating 200, platinum, nickel, and tungsten are the materials used for constructing the sensor 225. As illustrated in FIG. 2A, the specific pattern of the temperature sensor 225 extends along a substantial portion of the buses 230A and 230B, providing some averaging of the temperatures along its location. Another exemplary temperature sensor design is illustrated in FIG. 5, where a temperature sensor 525 provides a more localized reading of the temperatures of a grating 500.

Figure 3:
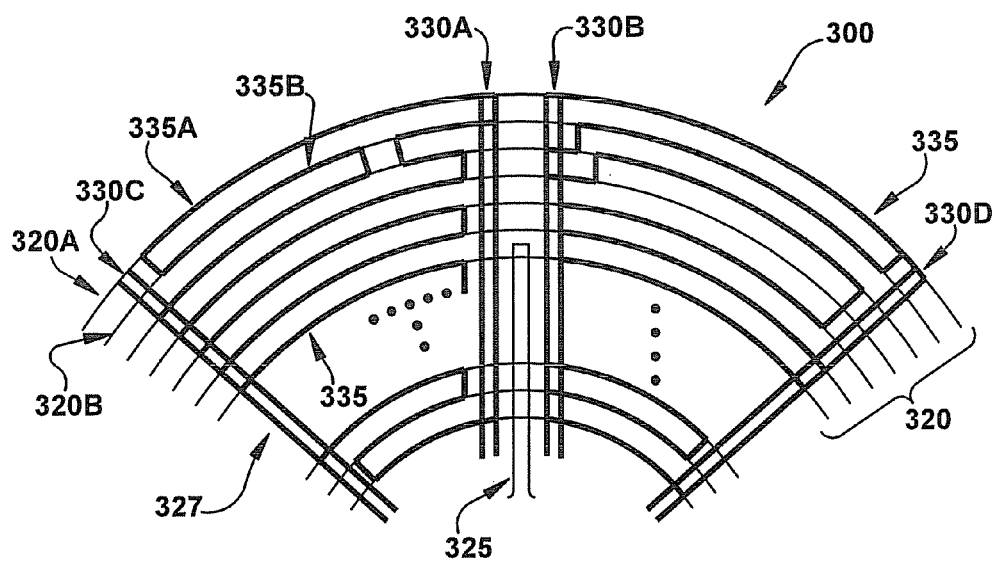
FIG. 3 is a top view of an arrayed waveguide grating having an integrated patterned heater with elements covering multiple waveguides, in accordance with the present invention.

FIG. 3 illustrates a top view of an exemplary arrayed waveguide grating 300 in accordance with the present invention. As can be seen from this Figure, heater elements 335 of a patterned heater 327 zigzag between each pair of buses 330. The length of each heater element 335 can be substantially the same, and the resistance of each heater element 335 per unit length can be also substantially constant. It follows that each element 335 can dissipate substantially the same power per unit length. The heater elements 335 zigzag to cover a different number of waveguides 320, because the waveguides 320 are longer towards the top of FIG. 3 and shorter towards the bottom of FIG. 3. Moreover, different portions of one of the waveguides 320 can be covered by different heater elements 335. See, for example, heater elements 335A and 335B, each covering portions of both waveguides 320A and 320B.

The processes for fabricating arrayed waveguide structures on planar lightwave circuits are generally known to those skilled in the art and, accordingly, there is no need to describe them in detail. For completeness, a brief description follows.

Referring again to FIGS. 2A and 2B, the lower cladding layer 210 can be grown or deposited on the substrate 205 using known techniques, such as thermal oxidation, chemical-vapor deposition (CVD), flame hydrolysis deposition (FHD), and laser reactive deposition (LRD). A doped silica layer can be deposited on the lower cladding layer 210, also using CVD, FHD, or LRD. The doped silicon layer has a refractive index higher than the refractive index of the lower cladding layer 210. Photolithographic techniques can be used to transfer onto the doped silicon layer a photoresist mask defining the curvilinear waveguides 220, and the waveguides 220 can be formed by reactive ion etching of the areas of the doped silica layer exposed through the mask. Next, the photoresist mask can be removed, and the upper cladding layer 215 can be deposited on the waveguides 220 and on the lower cladding layer 210, using CVD, FHD, or LRD. The upper cladding layer 215 may be made of silica or doped silica, with a refractive index that is lower than the refractive index of the waveguides 220. In one specific embodiment, the refractive index of the upper cladding layer 215 substantially matches the refractive index of the lower cladding layer 210, and has a thickness of between about 5 and about 20 micrometers above the upper surfaces of the waveguides 220.

A thin-film conductive layer can be formed on the upper cladding layer 215, using CVD, LRD, FHD, spin-on coating, evaporation, or sputtering techniques, for example. The conductive layer can be patterned into the integrated heater 227 and the temperature sensor 225, using another photoresist mask and an etching process. In some variants of the grating 200, the entire device can be then coated with a protective layer, which can be made, for instance, of silicon dioxide or silicon oxynitride deposited by CVD or LRD or FHD.

Figure 4:
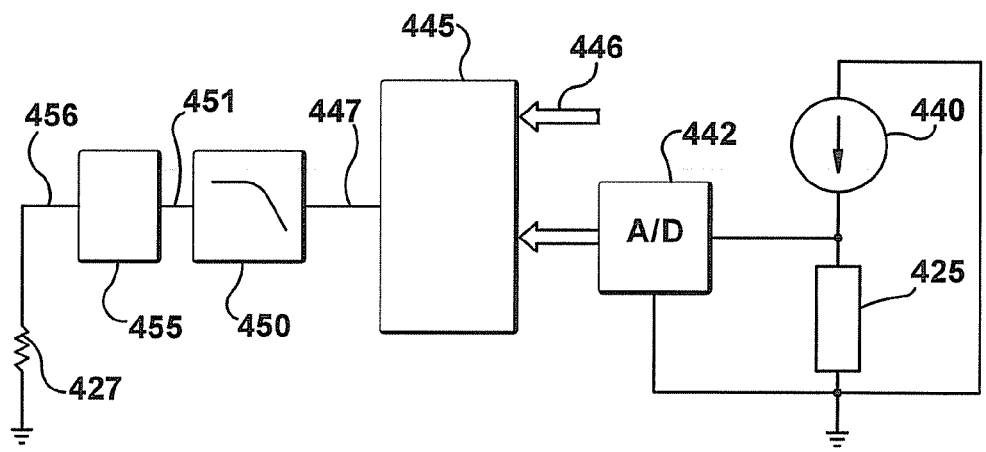
FIG. 4 is a high-level, simplified schematic block diagram of a temperature control system for driving a heater of an arrayed waveguide grating, in accordance with the present invention.

FIG. 4 illustrates a high-level schematic block diagram of an exemplary temperature control system 400 for driving a heater of an arrayed waveguide grating, in accordance with the present invention. Numerals 427 and 425 refer to a heater and a temperature sensor of the grating, respectively. A temperature-compensated current source 440 can drive an RTD (resistance temperature device) sensor 425. Various thermistors, diodes, and thermocouples can also be used as temperature sensors. Note also that the current source 440 can be replaced by a current sink, without affecting principles of operation of the system 400.

The voltage developed across the temperature sensor 425 can be input into a temperature reader 442, such as an analog-to-digital (A/D) converter illustrated in FIG. 4. A comparator 445 can compare the reading received from the temperature reader 442 to a set-point voltage received from an input 446, and can generate a difference signal at an output 447. The difference signal then can go through a filtering mechanism 450 and can control a heater driver circuit 455. In the illustrated embodiment, the heater driver circuit 455 can be a pulse-width modulator, while the filtering mechanism 450 can be a low-pass time-averaging filter.

The comparator 445 and the filter mechanism 450 can be implemented in program code executed by a microcontroller. The microcontroller periodically can initiate operation of the A/D converter 442 (which can be part of the same microcontroller), and can read the output generated by the A/D converter 442. The microcontroller then can compare the reading to the set-point temperature signal at the input 446, can calculate the difference between the two signals, and can average the difference over a predetermined time period to produce a heater control signal at an output 451.

In some variants of the exemplary temperature control system 400, the averaging period can be of the order of the thermal time constant of the system 400, i.e., the time constant that describes propagation of a change in heater output to a change in the wavelength response of the optical filter. In more specific variants of the temperature control system 400, the averaging period can be between about 1.5 and 5 times the system's thermal time constant.

The output 451 of the filtering mechanism 450 controls the pulse-width of the signal at an output 456 of the heater driver circuit 455. The polarity of the comparator 445 can be such that the width of the pulses output by the circuit 455 increases when the comparator 445 detects that the temperature corresponding to the signal at its input 446 is higher than the temperature detected by the sensor 425. In this way, varying the set-point voltage varies the temperature of the temperature sensor 425 in a one-to-one correspondence.

There are many other ways to implement a temperature controller for the arrayed waveguide gratings in accordance with the present invention, including both analog and digital controller implementations. Off-the-shelf temperature controllers can also be procured from a number of sources, including temperature controllers available from Omega Engineering, Inc., 1 Omega Drive, Stamford, Conn., www.omega.com, 1-800-872-9436.

Turning now to the method for tuning and temperature-stabilizing an arrayed waveguide grating, for example, grating 200 of FIG. 2, the concept of "effective temperature" or $T_\lambda$ is defined. From the theory of operation of arrayed waveguide gratings presented above in this document, it is clear that a grating's center wavelength $\lambda_c$ is a function of the grating's uniform temperature, t. This functional dependence is hereby designated as $\lambda_c(t)$. When the temperature of the grating is not uniform throughout the grating, some phase error and distortion of the grating's passband may result, but an identifiable center wavelength $\lambda_c = \lambda_1$ will likely persist. The effective temperature $T_\lambda$ of the grating in this thermal state is defined by reference to the same grating, but uniformly heated: $\lambda_c(T_\lambda) = \lambda_1$. In other words, the effective temperature $T_\lambda$ of a non-uniformly heated grating having a center wavelength $\lambda_1$ is equal to the uniform temperature of the same grating having the same center wavelength $\lambda_1$.

Also defined are the concepts of the sensor temperature $T_r$, and global or environment temperature $T_e$, which is the temperature that affects the arrayed waveguide grating as a whole. For a grating covered with a patterned integrated heater, the temperature $T_r$ of the sensor proximal to the heater is expected to be higher than the environment temperature $T_e$, because the patterned heater covers a portion of the grating and heat will flow from the heater to the regions of the chip that are remote from the heater.

Empirical findings and finite element thermal and optical analyses both lead to two useful results:

$$T_r = T_e = \left(\frac{dT_r}{dW}\right) * W, \quad (1)$$

and $$T_\lambda = T_e + \left(\frac{dT_\lambda}{dW}\right) * W. \quad (2)$$

In equations (1) and (2), W is the power dissipated in the patterned heater;

$$\left(\frac{dT_r}{dW}\right)$$

is a constant that represents the sensitivity of $T_r$ to power of the patterned heater; and $$\left(\frac{dT_\lambda}{dW}\right)$$

is a constant that represents the sensitivity of the effective temperature to power of the patterned heater. Equation (1) is ultimately an expression of constant thermal resistance, i.e., of the linear relationship between temperature elevation and the power dissipated in the heater. The temperature difference between the grating and the environment ($T_e$) is therefore the product of a thermal constant and the total power flowing from the grating's heater to the environment (W). By determining the temperature at an intermediate point ($T_r$) and knowing the total heat flow (W) and correlation to the thermal constant $$\left(\frac{dT_r}{dW}\right)$$

one can compute both the temperature of the environment ($T_e$) and the temperature under the grating. Equation (2) is simply an expression of the native thermal dependence of the optical filter translated to the effective temperature ($T_\lambda$) induced by the heater.

$$\left(\frac{dT_\lambda}{dW}\right)$$

will be expected to be larger than $$\left(\frac{dT_r}{dW}\right),$$

because the patterned heater is designed to tilt the wavefront in the grating more efficiently than a uniform heater.

Note that it is possible to design an optical chip wherein the accuracy of equations (1) and (2) will degrade, such as when the sensor measuring $T_r$ is too remote from the heat flow. In some embodiments in accordance with the invention, optical and thermal designs can be such that the accuracy of equations (1) and (2) is within prescribed limits adequate for the particular application at hand. For example, the designs may be required not to deviate from equations (1) and (2) by more than about 1 degree Celsius over the entire environmental temperature range. Confirmation can be performed empirically or through optical and thermal modeling.

Each of the above two equations has three variables: $T_r$, $T_e$, and W in equation (1); and $T_\lambda$, $T_e$, and W in equation (2). The power dissipated in the heater, W, can be measured (or set) directly by monitoring (or establishing) the voltage and current applied by the heater driver. Both $T_r$ and $T_e$ can be estimated or measured by temperature sensors. In fact, $T_r$ is the temperature reading of the temperature sensor 225. Given $T_r$ and W, we can calculate $T_e$ from equation (1):

$$T_e = T_r = \left(\frac{dT_r}{dW}\right) * W.$$

Therefore, $T_e$ need not be measured. Once $T_e$ is known, $T_\lambda$ can be calculated directly from equation (2). Combining these two steps into one, an equation can be obtained for calculating $T_\lambda$ from $T_r$:

$$T_\lambda = T_r - \left(\frac{dT_r}{dW}\right) * W + \left(\frac{dT_\lambda}{dW}\right) * W \quad (3)$$
$$\equiv T_r + \left(\left(\frac{dT_\lambda}{dW}\right) - \left(\frac{dT_r}{dW}\right)\right) * W$$
$$\equiv T_r + B * W.$$

In implementing temperature stabilization in accordance with this equation, W can be measured or set; a target for $T_r$, which will be referred to as the set-point temperature and labeled $T_s$, can also be selected. In this embodiment $T_s$ does not represent the uniform grating temperature, but it is directly analogous to a set-point temperature to be maintained by a temperature controller, at least for a good design under expected environmental conditions. The constants $$\left(\frac{dT_\lambda}{dW}\right) \text{ and } \left(\frac{dT_r}{dW}\right)$$

can be determined empirically or accurately estimated, for example, by using finite-element thermal and optical analyses. Thus, equation (3) can be used to maintain the design effective temperature of the grating (and therefore the design center wavelength of the grating), using temperature readings $T_r$ provided by a single sensor, and knowledge of the power being applied to the heater. A dynamic negative-feedback process can be used to stabilize the grating at $T_\lambda$(design), the effective temperature corresponding to the designed center wavelength. One such process is described below. Note that in some embodiments the feedback loop can be digital; in other embodiments, the loop and the feedback process can be analog, or a suitable mixture of digital and analog.

First, W will be expressed in terms of the other constants and parameters. Equation (1) gives this relationship:

$$W = \frac{T_r - T_e}{\left(\frac{dT_r}{dW}\right)}. \tag{4}$$

This result can be substituted into equation (2):

$$T_\lambda = T_e + (T_r - T_e) * \left(\frac{\frac{dT_\lambda}{dW}}{\frac{dT_r}{dW}}\right). \tag{5}$$

Similarly, $T_r$ can be expressed in terms of $T_\lambda$ and $T_e$:

$$T_r = T_e + (T_\lambda - T_e) * \left(\frac{\frac{dT_r}{dW}}{\frac{dT_\lambda}{dW}}\right). \tag{6}$$

In the beginning of the stabilization-control process, the initial temperature sensor measurement $T_r(1)$ can be used as an estimate of initial effective temperature $T_\lambda(1)$ and initial global temperature $T_e(1)$, which should yield accurate estimates before the integrated heater is powered, at least as an initial point of the iterative process. Then the initial set-point temperature $T_s(1)$ for the temperature controller can be calculated from modified equation (6):

$$T_s(1) = T_e(1) + (T_\lambda(\text{design}) - T_e(1)) * \left(\frac{\frac{dT_r}{dW}}{\frac{dT_\lambda}{dW}}\right), \tag{7}$$

where $T_\lambda(\text{design})$ stands for the effective temperature needed to achieve the design center wavelength of the grating. The temperature controller is set to the calculated set-point temperature $T_s(1)$, applying power to the heater. This raises the temperature at the sensor ($T_r$) and, typically by a lesser amount, the global temperature ($T_e$). Next, a subsequent temperature reading $T_r(2)$ is obtained from the temperature sensor, and $W(2)$ is measured and, optionally, averaged over some time period that may be longer than the small-signal thermal response time. The global temperature at that time ($T_e(2)$) is calculated from modified equation (1):

$$T_e(2) = T_r(2) - \left(\frac{dT_r}{dW}\right) * W(2). \tag{8}$$

The feedback loop directs the controller to increase power applied to the heater when $T_r$ is lower than $T_s$, and to decrease the power when $T_r$ is higher than $T_s$, thereby compelling $T_r$ to move towards $T_s$. In determining how much to increase or decrease the power, the controller may consider not only whether the sensor temperature is simply above or below the set-point temperature, but also the size of the difference between the temperatures ('proportional'), how fast the temperature difference is changing ('derivative'), recent temperature history ('integral'), and other factors, such as acceleration and bandwidth. The techniques for utilizing these factors in determining the amount of power to be applied to the heater have been described in the literature on PID (proportional-integral-derivative) temperature controllers.

The effective temperature of the grating ($T_\lambda(2)$) is available from equation (2):

$$T_\lambda(2) = T_e(2) + \left(\frac{dT_\lambda}{dW}\right) * W(2). \tag{9}$$

Next, the second set-point temperature $T_s(2)$ for the integrated heater can be calculated from the modified equation (6):

$$T_s(2) = T_e(2) + (T_\lambda(\text{design}) - T_e(2)) * \left(\frac{\frac{dT_r}{dW}}{\frac{dT_\lambda}{dW}}\right). \tag{10}$$

Figure 6A:
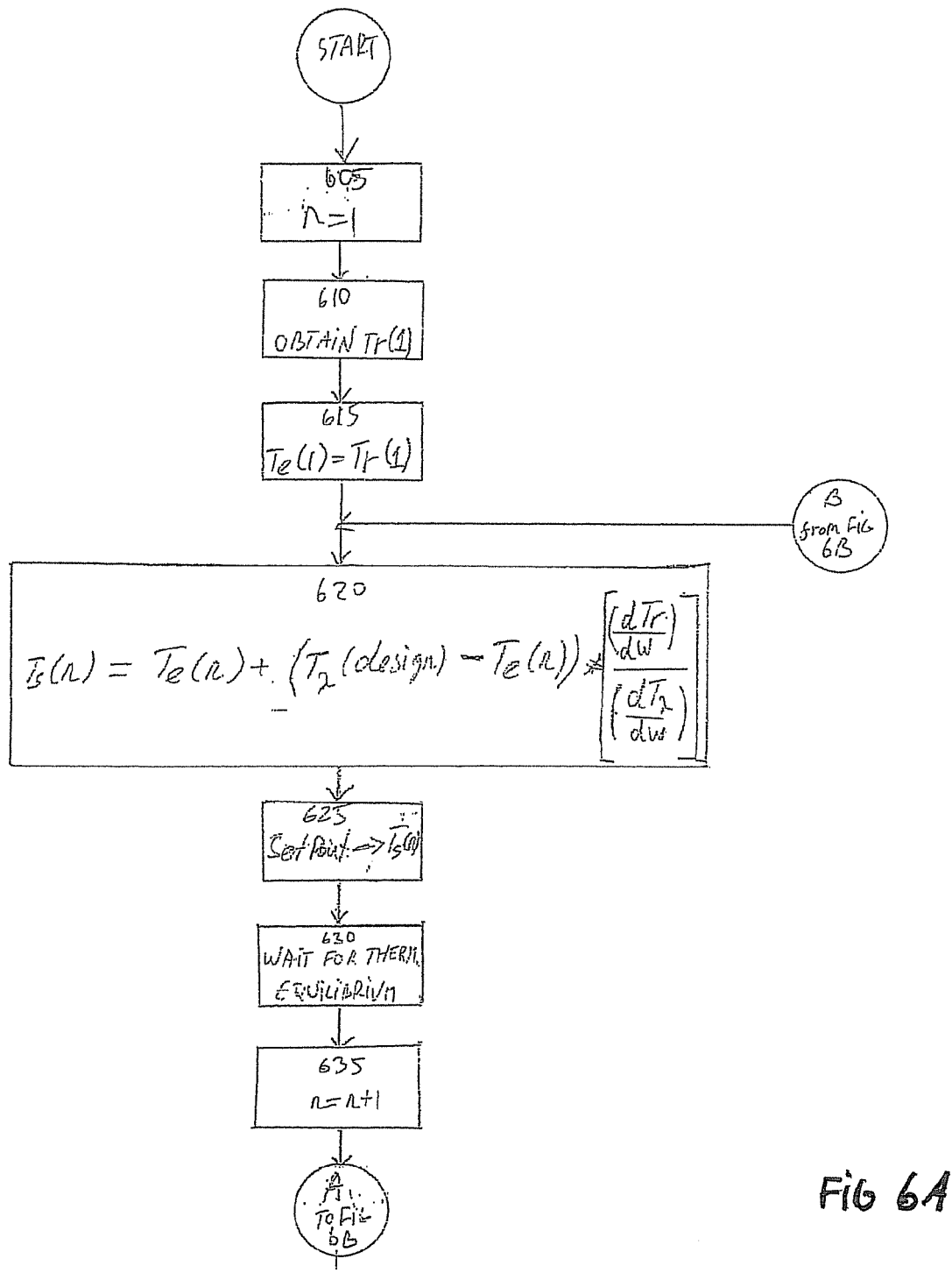
FIGS. 6A and 6B illustrate selected steps of an iterative process for temperature-stabilizing and arrayed waveguide grating, in accordance with the present invention.
Figure 6B:
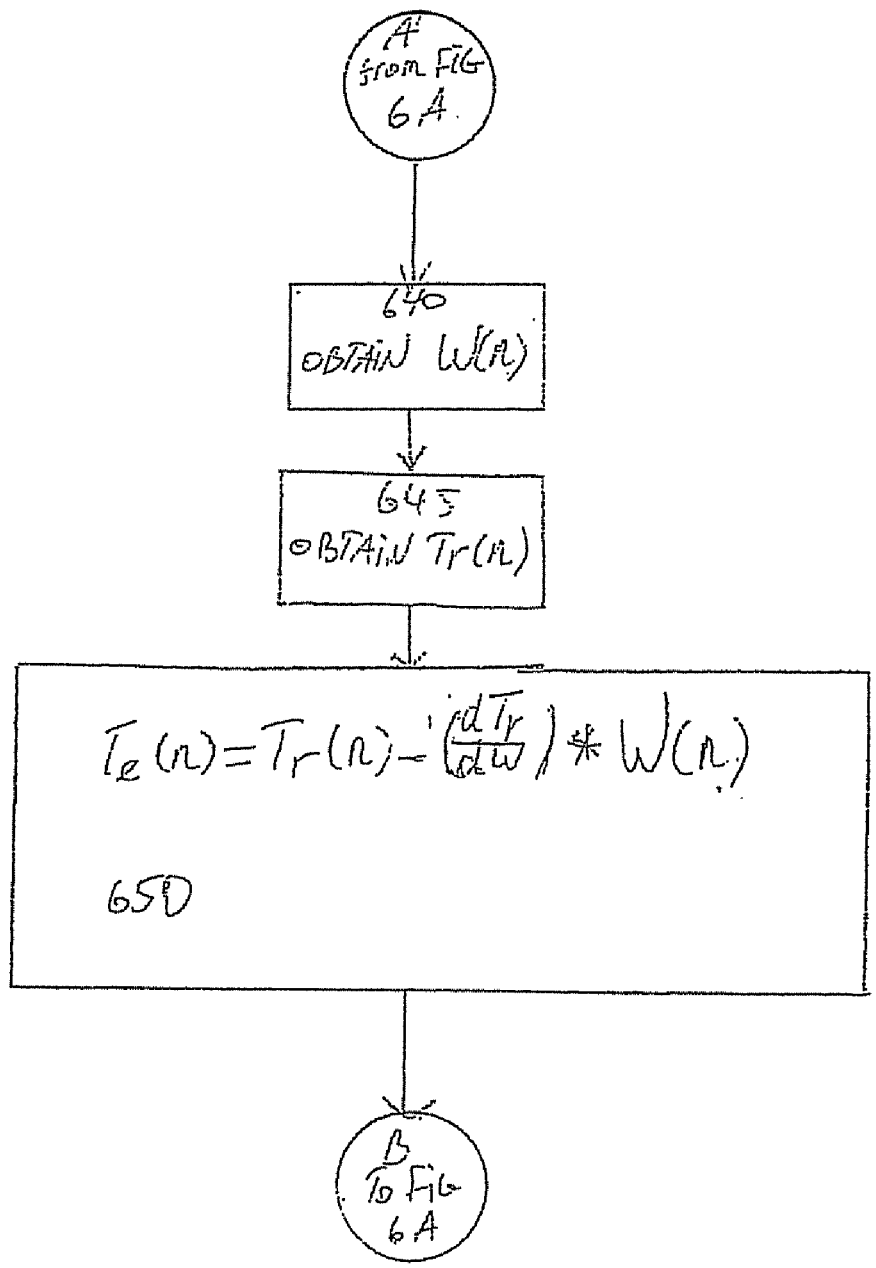

The steps of this iterative process, illustrated in FIGS. 6A and 6B, can be repeated continually to bring the grating to the design effective temperature, and maintain it there. During stable operation, $T_r$ and $T_s$ should be about the same. The difference between the calculated $T_\lambda$ and the design $T_\lambda$ is a measure of performance of the temperature stabilization scheme employed. Although the stabilization techniques have been described as discrete digital operations, the computations and responses can be linear and continuous. Therefore, a person skilled in the art would understand that equivalent operations can be performed by analog processing in either discrete or continuous fashion.

One additional observation is in order at this point. The operation of the integrated patterned heater need not be, and typically is not, entirely localized to its footprint; it affects all portions of the grating to some extent. The non-localized effect of the heater, however, is conceptually similar to many other environmental factors affecting $T_e$. For this reason, the non-localized effect of the heater has been ignored in the course of the present discussion.

Figure 7:
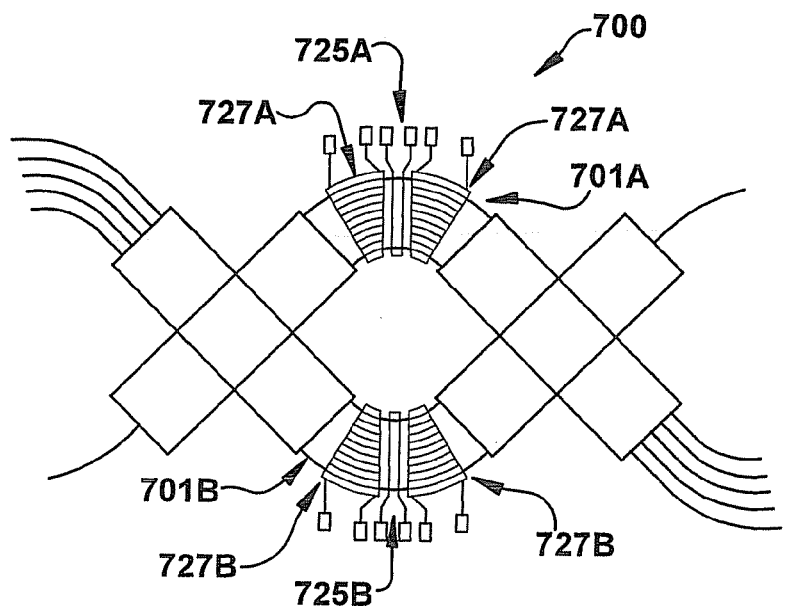
FIG. 7 is a high-level, simplified schematic block diagram of a combination of two arrayed waveguide gratings, each covered with a patterned heater and having a temperature sensor.

With the above analysis in mind, the case of multiple gratings (or other optical components, or suitable configurations of multiple optical components) fabricated on the same substrate is now analyzed. FIG. 7 illustrates an exemplary combination 700 of two arrayed waveguide gratings, 701A and 701B, each covered with an efficient patterned heater and having a temperature sensor. Both gratings are fabricated on the same substrate.

The grating 701A can be associated with a heater 727A and a temperature sensor 725A; the grating 701B can be associated with a heater 727B and a temperature sensor 725B. As can be illustrated in FIG. 7, each temperature sensor can be disposed so as to respond substantially to the local temperature of its associated grating. Cross heating effects of the heaters on the opposite gratings/sensors (e.g., heating of the grating 701A by the heater 727B), can be present, but once again, these secondary effects are subsumed within other factors affecting the global temperatures of the two gratings. Thus, each grating can be stabilized separately (i.e., individually), using temperature controllers similar to the temperature controller 400 of FIG. 4, and iterative processes similar to the process 600 of FIGS. 6A and 6B.

The cross heating effects have one beneficial result: they reduce the total power dissipated by the two heaters 727. In practice, the combined power dissipated by the two heaters 727 can be considerably less than twice the power of a single grating/heater combination. Indeed, the combined power of the two heaters can be only slightly higher than the power dissipated in the single grating/heater combination.

Figure 8:
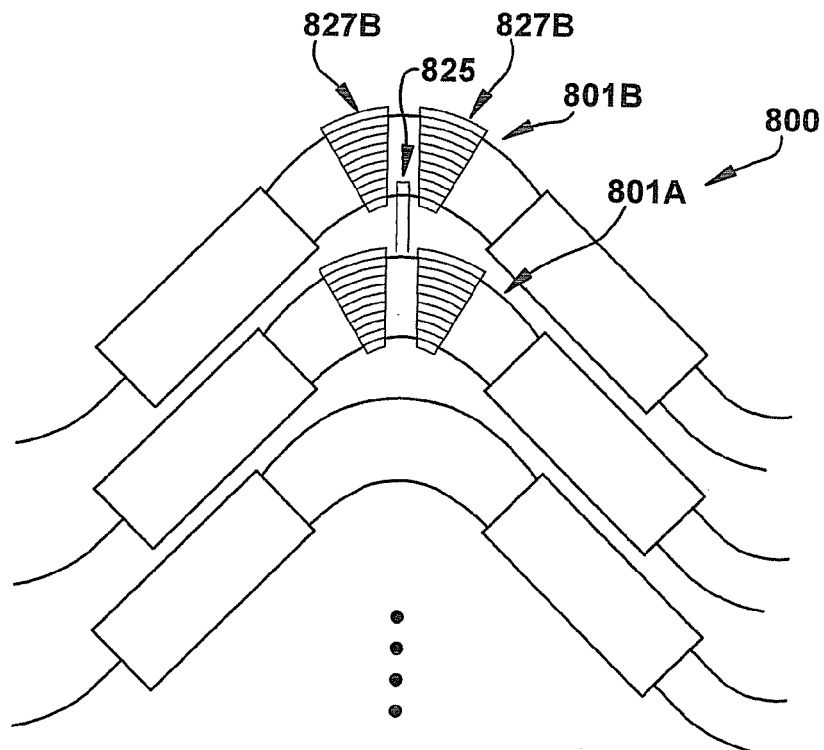
FIG. 8 is a high-level, simplified schematic block diagram of a combination of two arrayed waveguide gratings, each covered with a patterned heater, sharing a single temperature sensor.

FIG. 8 illustrates a combination 800 of two arrayed waveguide gratings 801A and 801B fabricated on one substrate, with two associated heaters 827A and 827B. The combination 800 is similar to the combination 700, but employs a single temperature sensor 825 to temperature-stabilize both gratings 801A and 801B. The temperature sensor 825 is disposed proximate the grating 801B, so that its readings are more indicative of the temperature of the grating 801B than of the temperature of the grating 801A. The grating 801B will be referred to as the primary grating, and the grating 801A will be referred to as the secondary or dependent grating.

The method for temperature-stabilizing a multi-grating, single temperature sensor chip (substrate) is similar to the dual sensor case, with one difference being that temperature control of one of the gratings is dependent upon the control of the other grating, hence the control of the dependent grating becomes an open-loop process.

Before proceeding, the following variables, parameters, and constants are defined:

1. $T_\lambda^A$ is the effective temperature of the grating 801A;
2. $T_\lambda^B$ is the effective temperature of the grating 801B;
3. $W^A$ is the power provided to and dissipated by the heater 827A;
4. $W^B$ is the power provided to and dissipated by the heater 827B;
5.

$$\frac{dT_\lambda^A}{dW^A}$$

is the sensitivity of $T_\lambda^A$ to $W^A$;
6.

$$\frac{dT_\lambda^B}{dW^B}$$

is the sensitivity of $T_\lambda^B$ to $W^B$;
7. $T_r$ is the temperature indication of the temperature sensor (as in the single grating case treated above);
8.

$$\frac{dT_r}{dW^A}$$

is the sensitivity of the temperature $T_r$ of the temperature sensor to the power $W^A$; and
9.

$$\frac{dT_r}{dW^B}$$

is the sensitivity of the temperature $T_r$ of the temperature sensor to the power $W^B$.

Empirical results and finite element thermal and optical analyses lead to a useful relationship among several factors:

$$T_\lambda^A - T_\lambda^B = \left(\frac{dT_\lambda^A}{dW^A}\right)*W^A - \left(\frac{dT_\lambda^B}{dW^B}\right)*W^B, \quad (11)$$

where the constants $$\frac{dT_\lambda^A}{dW^A}, \text{ and } \frac{dT_\lambda^B}{dW^B}$$

can be estimated empirically, or by using finite element thermal and optical analyses. Having selected the grating 801A to be the dependent grating, equation (11) can be now rearranged to express $W^A$ as a function of $W^B$ and of the static parameters, and get the following dependence:

$$W^A = \frac{T_\lambda^A - T_\lambda^B + \left(\frac{dT_\lambda^B}{dW^B}\right)*W^B}{\left(\frac{dT_\lambda^A}{dW^A}\right)}. \quad (12)$$

In this embodiment, the drive power $W^B$ used to stabilize the primary grating can be controlled according to the methods described previously for the single grating case, lumping the effect of the heater 827A on the temperature of the primary grating 801B together with other environmental effects. The drive power $W^B$ can be thus available, because it is either set directly by the temperature controller or can be measured, for example, using a current sensor that indicates the current through the primary grating 801B. All other terms of equation (12) that are necessary to determine $W^A$ are also available: (1) the values used for $T_\lambda^A$ and $T_\lambda^B$ are the effective temperatures of the respective gratings needed to achieve each design center wavelength, which are hereby designated by $T_\lambda^A(\text{design})$ and $T_\lambda^B(\text{design})$; and (2) the response coefficients $$\frac{dT_\lambda^A}{dW^A}, \text{ and } \frac{dT_\lambda^B}{dW^B}$$

are constants of the device determined empirically or through modeling (optical and thermal) for the intended operation. For each operating point of $W^B$, the appropriate power to provide to and dissipate in the heater 827A of the dependent grating 801A can be determined using:

$$W^A = \frac{T_\lambda^A(\text{design}) - T_\lambda^B(\text{design}) + \left(\frac{dT_\lambda^B}{dW^B}\right)*W^B}{\left(\frac{dT_\lambda^A}{dW^A}\right)}. \quad (14)$$

This document describes the inventive optical devices and methods for thermally tuning and stabilizing them in considerable detail for illustration purposes only. Neither the specific embodiments of the invention as a whole, nor those of its features limit the general principles of the invention. In particular, the invention is not limited to arrayed waveguide gratings, but includes other optical devices. The invention is also not limited to particular temperature controllers, heaters, temperature sensors, and other components described, but extends to all applications of the principles underlying the invention. The specific features described herein may be used in some embodiments, but not in others, without departure from the spirit and scope of the invention as set forth. Furthermore, the specific iterative process described to stabilize the wavelength response of the device need not limit the invention. Other iterative processes can be used to tune and stabilize optical components at their design center wavelengths. Different physical arrangements of components and different step sequences also fall within the intended scope of the invention, and embodiments with two gratings are intended to illustrate principles equally applicable to embodiments with three and more gratings. It should also be noted that in the description and claims relating to the apparatus embodiments of the invention, "couple," "connect," and similar words with their inflectional morphemes do not necessarily import an immediate or direct connection, but include connections through mediate elements within their meanings. In this document, "of the order of" and similar expressions used with reference to a parameter or quantity signify a variation of about one order of magnitude (a factor of ten) in either direction. Similarly, as utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

We claim:

1. An integrated optical device, comprising:
an optical component having an optical wavelength response that is a function of temperature of the optical component, the optical component comprising at least one selected from the group consisting of waveguides, optical couplers, splitters, three dimensional optical memory devices, Bragg gratings, optical attenuators, optical splitters, optical filters, optical switches, lasers, modulators, interconnects, optical isolators, optical add-drop multiplexers, optical amplifiers, optical polarizers, optical circulators, phase shifters, optical mirrors/reflectors, optical phase-retarders, or optical detectors;
a heating element disposed in proximity to the optical component to be capable of inducing temperature elevation of the optical component;
a temperature-sensing element capable of generating indications of temperature at location of the temperature-sensing element, wherein temperature elevations induced at the location by the heating element exceed corresponding temperature elevations induced in at least one region of the optical device by the heating element; and
a temperature controller coupled to the heating element and to the temperature-sensing element to receive the indications of temperature and to set power dissipated in the heating element based on the indications of temperature received from the temperature-sensing element so as to drive the optical wavelength response to a predetermined wavelength, wherein:
indications of temperature generated by the temperature-sensing element during stable thermal state of the optical device vary as a first substantially linear function of the power dissipated in the heating element;
effective temperature of the optical component during stable thermal state varies as a second substantially linear function of the power dissipated in the heating element;
the first substantially linear function is characterized by a first thermal constant $$\left(\frac{dT_r}{dW}\right)$$

that is the rate of increase in the indications of temperature with the power dissipated in the heating element;
the second substantially linear function is characterized by a second thermal constant $$\left(\frac{dT_\lambda}{dW}\right)$$

that is the rate of change in the optical wavelength response with the power dissipated in the heating element;
the temperature controller is capable of estimating global temperature ($T_e$) of the optical component during a first period based on (i) one or more temperature indications received from the temperature-sensing element during the first period, (ii) the power dissipated by the heating element during the first period, and (iii) the first thermal constant;
the optical wavelength response of the optical component is substantially equal to the predetermined wavelength at a first effective temperature of the optical component; and
the temperature controller is capable of determining a set-point to which the temperature controller drives temperature indications of the temperature-sensing element during a second period that follows the first period by
computing a difference between the first effective temperature and the estimate of the global temperature of the optical component during the first period,
computing a ratio of the first thermal constant to the second thermal constant,
computing a product of the difference and the ratio, and
adding the product to the estimate of the global temperature of the optical component during the first period to obtain the set-point.

2. The integrated optical device according to claim 1, wherein the optical component comprises an optical coupler.

3. The integrated optical device according to claim 1, wherein the optical component comprises an optical splitter.

4. The integrated optical device according to claim 1, wherein the optical component comprises an optical attenuator.

5. An integrated optical device according to claim 1, wherein the heating element comprises an efficient patterned heater.

6. An integrated optical device according to claim 1, wherein the temperature sensing element comprises a resistance temperature device.

7. An integrated optical device according to claim 1, wherein the temperature controller performs an iterative adjustment of the power dissipated in the heating element to drive the optical wavelength response to the predetermined wavelength.

8. An integrated optical device according to claim 1, wherein duration of the first period is of the order of a thermal time constant characterizing propagation of changes in the power dissipated in the heating element to changes in the optical wavelength response.

9. An integrated optical device according to claim 1, wherein duration of the first period is greater than a thermal time constant characterizing propagation of changes in the power dissipated in the heating to changes in the optical wavelength response.

10. An integrated optical device according to claim 1, wherein:
   the heating element comprises a heater active portion that dissipates substantially all of the power dissipated by the heating element;
   the temperature-sensing element comprises a sensor active portion with resistance that varies as a function of temperature; and
   the heater and sensor active portions are made from the same material.

11. An integrated optical device according to claim 1, wherein the temperature-sensing element comprises a first patterned thin conductive film disposed on the optical component.

12. An integrated optical device according to claim 11, wherein the heating element comprises a second patterned thin conductive film disposed on the optical component.

13. An integrated optical device, comprising:
   a first optical component having a first optical wavelength response that is a function of temperature of the first optical component, the first optical component comprising at least one selected from the group consisting of waveguides, optical couplers, splitters, three dimensional optical memory devices, Bragg gratings, optical attenuators, optical splitters, optical filters, optical switches, lasers, modulators, interconnects, optical isolators, optical add-drop multiplexers, optical amplifiers, optical polarizers, optical circulators, phase shifters, optical mirrors/reflectors, optical phase-retarders, or optical detectors;
   a first heating element disposed in proximity to the first optical component to be capable of inducing temperature elevation of the first optical component, the first heating element comprising an efficient patterned heater;
   a first temperature-sensing element capable of generating indications of temperature at a first location of the first temperature-sensing element, wherein temperature elevations induced at the first location by the first heating element exceed corresponding temperature elevations induced by the heating element in a first region remote from the first location of the optical device;
   a first temperature controller coupled to the first heating element and to the first temperature-sensing element to receive the indications of temperature from the first temperature-sensing element and to set power dissipated in the first heating element based on the indications of temperature received from the first temperature-sensing element so as to drive the first optical wavelength response to a first predetermined wavelength;
   a second optical component having a second optical wavelength response that is a function of temperature of the second optical component, the second optical component comprising at least one selected from the group consisting of waveguides, optical couplers, splitters, three dimensional optical memory devices, Bragg gratings, optical attenuators, optical splitters, optical filters, optical switches, lasers, modulators, interconnects, optical isolators, optical add-drop multiplexers, optical amplifiers, optical polarizers, optical circulators, phase shifters, optical mirrors/reflectors, optical phase-retarders, or optical detectors;
   a second heating element disposed in proximity to the second optical component to be capable of inducing temperature elevation of the second optical component, wherein
   a second temperature-sensing element capable of generating indications of temperature at a second location of the second temperature-sensing element, wherein temperature elevation induced by the second heating element at the second location exceeds corresponding temperature elevations induced by the second heating element in a second region of the optical device; and
   a second temperature controller coupled to the second heating element and to the second temperature-sensing element to receive the indications of temperature from the second temperature-sensing element and to set power dissipated the second heating element based on the indications of temperature received from the second temperature-sensing element so as to drive the second optical wavelength response to a second predetermined wavelength, wherein
      indications of temperature generated by the first temperature-sensing element during stable thermal state vary as a first substantially linear function of the power dissipated in the first heating element;
   effective temperature of the first optical component during stable thermal state varies as a second substantially linear function of the power dissipated in the first heating element;
   indications of temperature generated by the second temperature-sensing element during stable thermal state vary as a third substantially linear function of the power dissipated in the second heating element; and
   effective temperature of the second optical component varies as a fourth substantially linear function of the power dissipated in the second heating element;
   the first substantially linear function is characterized by a first thermal constant that is the rate of increase in the indications of temperature generated by the first temperature-sensing element with the power dissipated in the first heating element;
   the second substantially linear function is characterized by a second thermal constant that is the rate of change in the effective temperature of the first optical wavelength response with the power dissipated in the first heating element;
   the first temperature controller is capable of estimating global temperature of the first optical component during a first period based on (i) one or more temperature indications received from the first temperature-sensing element during the first period, (ii) the power dissipated by the first heating element during the first period, and (iii) the first thermal constant;
   the first optical wavelength response is substantially equal to the first predetermined wavelength at a first effective temperature of the first optical component; and
   the first temperature controller is capable of determining a set-point to which the first temperature controller drives temperature indications generated by the first temperature-sensing element during a second period that follows the first period by computing a difference between the first effective temperature and the estimate of the global temperature of the first optical component during the first period, computing a ratio of the first thermal constant to the second thermal constant, computing a product of the difference and the ratio, and adding the product to the estimate of the global temperature of the first optical component during the first period to obtain the set-point.

14. An integrated optical device according to claim 13, wherein the first predetermined wavelength is equal to the second predetermined wavelength.

15. The integrated optical device according to claim 13, wherein the optical component comprises an optical coupler.

16. The integrated optical device according to claim 13, wherein the optical component comprises an optical splitter.

17. The integrated optical device according to claim 13, wherein the optical component comprises an optical attenuator.

18. A method for temperature-stabilizing an optical component of an optical device, the optical component having an optical wavelength response that is a function of temperature of the optical component, the optical wavelength response being equal to a predetermined wavelength when the optical component is at a first effective temperature, the optical component comprising at least one selected from the group consisting of waveguides, optical couplers, splitters, three dimensional optical memory devices, Bragg gratings, optical attenuators, optical splitters, optical filters, optical switches, lasers, modulators, interconnects, optical isolators, optical add-drop multiplexers, optical amplifiers, optical polarizers, optical circulators, phase shifters, optical mirrors/reflectors, optical phase-retarders, or optical detectors, the method comprising:

receiving indications of temperature from a temperature-sensing element on the optical device, the temperature-sensing element being capable of generating the indications of temperature at location of the temperature-sensing element; and regulating power provided to a heating element on the optical device so as to drive effective temperature of the optical component to the first effective temperature, wherein regulating power comprises using a linearized model of the optical device wherein, at stable thermal state, effective temperature of the optical component increases at a first rate with increasing the power provided to the heating element, and the indications of temperature increase at a second rate with increasing the power provided to the heating element; wherein the temperature controller is capable of determining a set-point to which the temperature controller drives temperature indications of the temperature-sensing element by computing a difference between the first effective temperature and the estimate of the global temperature of the optical component, computing a ratio of the first thermal constant to the second thermal constant, computing a product of the difference and the ratio, and adding the product to the estimate of the global temperature to obtain the set-point.

19. The method in accordance with claim 18, wherein:

the optical wavelength response of the optical component is substantially equal to the first predetermined wavelength at a first effective temperature of the optical component; and the temperature controller is capable of estimating global temperature ($T_e$) of the optical component based on (i) one or more temperature indications received from the temperature-sensing element, (ii) the power dissipated by the heating element, and (iii) the rate of increase in the indications of temperature with the power dissipated in the heating element during stable thermal state.

20. The method according to claim 18, wherein the optical device comprises an efficient patterned heater disposed on the optical component.

* * * * *